US012567883B2

(12) United States Patent
Wang et al.

(10) Patent No.: US 12,567,883 B2
(45) Date of Patent: Mar. 3, 2026

(54) ENERGY STORAGE SYSTEM AND INFORMATION TRANSMISSION APPARATUS FOR SAME

(71) Applicant: XIAMEN DONESTY ECOMMERCE CO., LTD., Xiamen (CN)

(72) Inventors: Hao Wang, Xiamen (CN); Haojun Hong, Xiamen (CN); Chenxin Hong, Xiamen (CN)

(73) Assignee: XIAMEN DONESTY ECOMMERCE CO., LTD., Xiamen (CN)

( * ) Notice: Subject to any disclaimer, the term of this patent is extended or adjusted under 35 U.S.C. 154(b) by 21 days.

(21) Appl. No.: 18/640,013

(22) Filed: Apr. 19, 2024

(65) Prior Publication Data

US 2025/0167829 A1     May 22, 2025

(30) Foreign Application Priority Data

Nov. 20, 2023     (CN) .......................... 202323136541.0

(51) Int. Cl.
| | |
|---|---|
| *H04B 5/79* | (2024.01) |
| *G05B 15/02* | (2006.01) |
| *H04B 5/20* | (2024.01) |
| *H04W 8/00* | (2009.01) |
| *G05B 15/00* | (2006.01) |

(52) U.S. Cl.
CPC .............. *H04B 5/79* (2024.01); *G05B 15/02* (2013.01); *H04B 5/20* (2024.01); *H04W 8/00* (2013.01); *G05B 15/00* (2013.01)

(58) Field of Classification Search
CPC . H04B 5/79; H04B 5/20; H04W 8/00; H04W 28/00; G05B 15/00; G05B 15/02; G05B 19/0421; G05B 19/418; G05D 1/00; G05D 1/0061; G05D 1/0088; G05D 1/02; B60W 60/00; A61B 5/00
See application file for complete search history.

(56) References Cited

U.S. PATENT DOCUMENTS

| | | | |
|---|---|---|---|
| 8,473,140 B2* | 6/2013 | Norris ............... | B60W 60/0051 701/23 |
| 2021/0157288 A1* | 5/2021 | Rischar ............ | G05B 19/41865 |
| 2022/0287563 A1* | 9/2022 | Wong ................... | A61B 5/0002 |

* cited by examiner

*Primary Examiner* — Van T Trieu

(57)          ABSTRACT

The present disclosure discloses an energy storage system and an information transmission apparatus for same. The information transmission apparatus for the energy storage system includes a plurality of device data collection terminals and a display terminal. Each of the plurality of device data collection terminals is adapted to be connected to one energy storage device. The display terminal is configured to perform wireless communication with the plurality of device data collection terminals. The device data collection terminal is configured to store a device query instruction to obtain, based on the device query instruction, device data from an energy storage device corresponding to the device data collection terminal, and to transmit the device data to the display terminal in response to receiving a data query instruction transmitted by the display terminal. The display terminal is configured to display the device data.

16 Claims, 3 Drawing Sheets

ENERGY STORAGE SYSTEM AND INFORMATION TRANSMISSION APPARATUS FOR SAME

CROSS-REFERENCE TO RELATED APPLICATION

This application claims priority to Chinese Patent Application No. 202323136541.0 filed on Nov. 20, 2023, the entire contents of which are incorporated herein by reference.

FIELD

The present disclosure relates to the field of energy storage device technologies, and more particularly, to an energy storage system and an information transmission apparatus for same.

BACKGROUND

With a promotion of the Internet of Things, user's demands for device communication functions are getting higher and higher. Although a conventional energy storage device (such as an inverter, a controller, and a lithium battery) has a communication function, the communication function is basically available for a single device. For example, devices of different brands need to be viewed through different mobile applications, and even different types of devices of the same brand need to be viewed through different mobile applications, for a reason that there is no data integration for all the devices. Therefore, a user needs to switch between a plurality of applications, which is time-consuming and laborious.

SUMMARY

The present disclosure aims to solve at least one of the technical problems in the related art to some extent. To this end, a first object of the present disclosure is to provide an information transmission apparatus for an energy storage system. A device data collection terminal is connected to an energy storage device. Each device data collection terminal is configured to obtain device data from an energy storage device corresponding to the device data collection terminal and transmit the device data to a display terminal. The display terminal is configured to display the device data. Therefore, data integration for a plurality of energy storage devices is realized. In this way, a user has no need to switch between applications frequently, which saves the user's time.

A second object of the present disclosure is to provide an energy storage system.

To achieve the above objects, according to an embodiment in a first aspect of the present disclosure, an information transmission apparatus for an energy storage system is provided. The information transmission apparatus includes a plurality of device data collection terminals and a display terminal. Each of the plurality of device data collection terminals is adapted to be connected to one energy storage device. The display terminal is configured to perform wireless communication with the plurality of device data collection terminals. The device data collection terminal is configured to store a device query instruction to obtain, based on the device query instruction, device data from an energy storage device corresponding to the device data collection terminal, and to transmit the device data to the display terminal in response to receiving a data query instruction transmitted by the display terminal. The display terminal is configured to display the device data.

According to the embodiment of the present disclosure, the information transmission apparatus for the energy storage system includes the plurality of device data collection terminals and the display terminal. Each of the plurality of device data collection terminals is adapted to be connected to one energy storage device. The device data collection terminal is configured to perform wireless communication with the display terminal. The device data collection terminal is configured to obtain, based on the stored device query instruction, the device data from the energy storage device corresponding to the device data collection terminal, and to transmit the device data to the display terminal in response to receiving the data query instruction transmitted by the display terminal. The display terminal is configured to display the device data. In this way, the device data of the plurality of energy storage devices can be displayed by the display terminal, which realizes the data integration for the plurality of energy storage devices. Therefore, the user has no need to switch between applications frequently, which saves the user's time.

According to an embodiment of the present disclosure, the device query instruction is obtained through performing a format conversion on the data query instruction by the device data collection terminal in response to receiving the data query instruction for a first time.

According to an embodiment of the present disclosure, a same communication protocol is adopted by each of the plurality of device data collection terminals and an energy storage device corresponding to the device data collection terminal.

According to an embodiment of the present disclosure, the device data collection terminal includes: a communication plug adapted to be connected to an energy storage device corresponding to the communication plug; a first networking module configured to support a wireless networking mode; a first networking button configured to enable, when triggered, the first networking module to enter the wireless networking mode; and a first display device configured to display a network connection state of the first networking module.

According to an embodiment of the present disclosure, the display terminal includes: a data processing module in communication connection with the plurality of device data collection terminals, the data processing module being configured to process the device data based on a predetermined display format; and a display module connected to the data processing module, the display module being configured to display the processed device data.

According to an embodiment of the present disclosure, the data processing module is further adapted to be connected to an upper computer. The data processing module is further configured to perform a format conversion on the device data, and to transmit the converted device data to the upper computer to enable the upper computer to display the converted device data.

According to an embodiment of the present disclosure, the display terminal further includes an upgrade interface adapted to be connected to an upper computer, to enable the upper computer to perform a firmware code upgrade on the display terminal.

According to an embodiment of the present disclosure, the information transmission apparatus further includes: a networking relay module disposed between the plurality of device data collection terminals and the display terminal, the networking relay module being configured to forward the data query instruction to the device data collection terminal and forward the device data to the display terminal.

According to an embodiment of the present disclosure, the networking relay module includes: a networking sub-module configured to support a wireless networking mode; a second networking button configured to enable, when triggered, the networking sub-module to enter the wireless networking mode; and a second display device configured to display a network connection state of the networking sub-module.

To achieve the above objects, according to an embodiment in a second aspect of the present disclosure, an energy storage system is provided. The energy storage system includes the information transmission apparatus for the energy storage system according to any of the above-mentioned embodiments.

For the energy storage system according to the embodiments of the present disclosure, the above-mentioned information transmission apparatus is adopted. The device data collection terminal is connected to the energy storage device. Each device data collection terminal is configured to obtain the device data from the energy storage device corresponding to the device data collection terminal and transmit the device data to the display terminal. The display terminal is configured to display the device data. Therefore, the data integration for the plurality of energy storage devices is realized. In this way, the user has no need to switch between applications frequently, which saves the user's time.

Additional aspects and advantages of the present disclosure will be provided at least in part in the following description, or will become apparent at least in part from the following description, or can be learned from practicing of the present disclosure.

DETAILED DESCRIPTION

Figure 1:
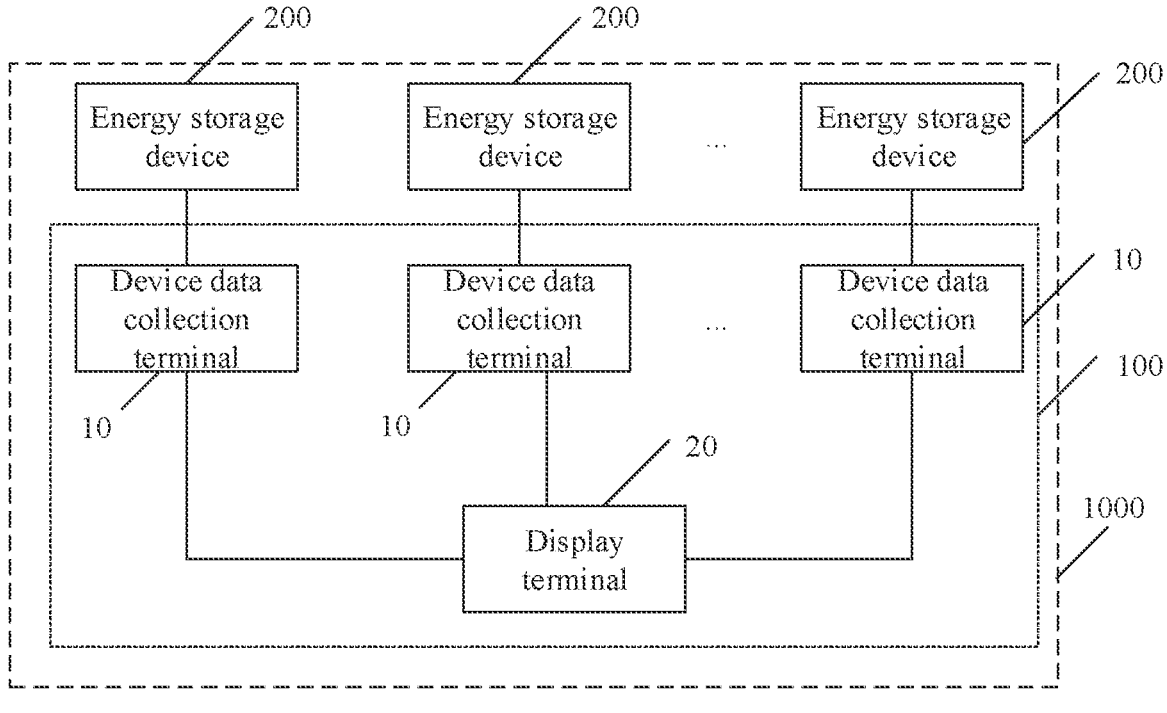
FIG. 1 is a schematic structural diagram of an energy storage system according to an embodiment of the present disclosure.

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limit, the present disclosure.

An energy storage system and an information transmission apparatus for same according to embodiments of the present disclosure are described below with reference to the accompanying drawings.

FIG. 1 is a schematic structural diagram of an energy storage system according to an embodiment of the present disclosure. As illustrated in FIG. 1, an information transmission apparatus 100 for the energy storage system includes a plurality of device data collection terminals 10 and a display terminal 20.

Each device data collection terminal 10 is adapted to be connected to one energy storage device 200. The display terminal 20 is configured to perform wireless communication with the plurality of device data collection terminals 10. The device data collection terminal 10 is configured to store a device query instruction to obtain, based on the device query instruction, device data from an energy storage device 200 corresponding to the device data collection terminal 10, and to transmit the device data to the display terminal 20 in response to receiving a data query instruction transmitted by the display terminal 20. The display terminal 20 is configured to display the device data.

In an exemplary embodiment of the present disclosure, each device data collection terminal 10 is connected to one energy storage device 200. The energy storage device 200 includes but is not limited to an inverter, a controller, and a lithium battery. The device query instruction is stored in the device data collection terminal 10. The device data collection terminal 10 is configured to obtain the device data from the energy storage device 200 corresponding to the device data collection terminal 10 using the device query instruction, temporarily store the device data, wait for the display terminal 20 to transmit the data query instruction, and transmit the device data to the display terminal 20 in response to receiving the data query instruction. The display terminal 20 has a function of displaying the device data. Since the wireless communication is performed between the display terminal 20 and the plurality of device data collection terminals 10, the display terminal 20 can display the device data transmitted by the plurality of device data collection terminals 10 in a concentrated way, which achieves data integration for the plurality of energy storage devices 200. In addition, the wireless communication can reduce use of wire harnesses and solve a problem of space limitation.

In some embodiments, a same communication protocol is adopted by each of the plurality of device data collection terminals 10 and an energy storage device 200 corresponding to the device data collection terminal.

It should be understood that the device data collection terminal 10 and the energy storage device 200 corresponding to the device data collection terminal 10 adopt the same communication protocol, in such a manner that the device data collection terminal 10 and the energy storage device 200 can communicate normally.

In another exemplary embodiment of the present disclosure, the display terminal 20 is further configured to transmit a device control instruction to the device data collection terminal 10. The device data collection terminal 10 is further configured to control, based on the device control instruction, the energy storage device 200 corresponding to the device data collection terminal 10 to operate.

In an exemplary embodiment of the present disclosure, the display terminal 20 further has a function of controlling the energy storage device 200. The user can set parameters of the energy storage device 200 through the display terminal 20. The display terminal 20 is configured to transmit the device control instruction to the device data collection terminal 10. The device data collection terminal 10 is configured to perform a format conversion on the device control instruction and control, based on the converted device control instruction, the energy storage device 200 corresponding to the device data collection terminal 10 to operate.

In the above embodiments, the device data collection terminal is connected to the energy storage device. Each device data collection terminal is configured to obtain the device data from the energy storage device corresponding to the device data collection terminal, and transmit the device data to the display terminal. The display terminal is configured to display the device data in a concentrated way. Therefore, the data integration for the plurality of energy storage devices is achieved, which allows the user to simply and quickly view the device data. In addition, since the wireless communication is performed between the device data collection terminal and the display terminal, problems of space limitation and a large number of wire harnesses brought by a wired connection can be avoided.

In some embodiments, the device query instruction is obtained through performing a format conversion on the data query instruction by the device data collection terminal 10 in response to receiving the data query instruction for a first time.

In an exemplary embodiment of the present disclosure, since a communication protocol between the device data collection terminal 10 and the display terminal 20 differs from the communication protocol between the device data collection terminal 10 and the energy storage device 200, the device data collection terminal 10 is unable to obtain the device data from the energy storage device 200 directly using the data query instruction. The device data collection terminal 10 is configured to perform the format conversion on the data query instruction in response to receiving the data query instruction for the first time, convert the data query instruction into the device query instruction recognizable by the energy storage device 200, and store the device query instruction. Then, the device data is obtained by the device data collection terminal 10 from the energy storage device 200 corresponding to the device data collection terminal 10 using the device query instruction and stored by the device data collection terminal 10. The device data collection terminal 10 is configured to transmit the device data directly to the display terminal 20 in response to receiving the data query instruction transmitted by the display terminal 20 for a second time.

It should be noted that since the communication protocol adopted by the display terminal 20 differs from the communication protocol adopted by the energy storage device 200, the device data collection terminal 10 is further configured to perform a format conversion on the device data, convert the device data into a data format corresponding to the communication protocol of the display terminal 20, and transmit the converted device data to the display terminal 20. In this way, the device data can be processed by the display terminal 20.

In another exemplary embodiment of the present disclosure, the device data collection terminal 10 is further provided with a device query instruction learning function. The display terminal 20 is configured to transmit a latest data query instruction to the device data collection terminal 10. The device data collection terminal 10 is configured to perform a format conversion on the latest data query instruction and store the converted latest data query instruction. In the related art, if a new device query instruction needs to be added to the device data collection terminal 10, a firmware upgrade needs to be performed on the device data collection terminal 10. With the above-mentioned method, a new device query instruction can be added to the device data collection terminal 10 without upgrading the device data collection terminal 10, which further saves the user's time.

In the above embodiment, since the communication protocol of the display terminal differs from the communication protocol of the energy storage device, a format conversion is performed on the data query instruction by the device data collection terminal to generate the device query instruction recognizable by the energy storage device. Then, the device data is obtained from the energy storage device using the device query instruction. Therefore, the device data is collected.

Figure 2:
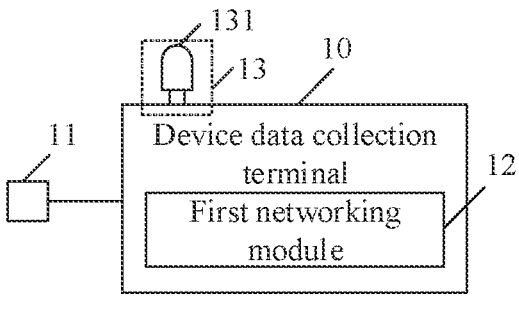
FIG. 2 is a schematic structural diagram of a device data collection terminal according to an embodiment of the present disclosure.

In some embodiments, as illustrated in FIG. 2, the device data collection terminal 10 includes a communication plug 11, a first networking module 12, a first networking button (not illustrated), and a first display device 13. The communication plug 11 is adapted to be connected to an energy storage device 200 corresponding to the communication plug 11. The first networking module 12 is configured to support a wireless networking mode. The first networking button is configured to enable, when triggered, the first networking module 12 to enter the wireless networking mode. The first display device 13 is configured to display a network connection state of the first networking module 12.

In an exemplary embodiment of the present disclosure, the energy storage device 200 has a communication network port. The communication plug 11 of the device data collection terminal 10 is connected to the communication network port of the energy storage device 200, in such a manner that data transmission can be performed between the device data collection terminal 10 and the energy storage device 200. Then wireless networking for the display terminal 20 and the device data collection terminal 10 is required. The first networking module 12 is configured to enter the wireless networking mode when the user presses the first networking button, to enable the device data collection terminal 10 to enter a networking mode. In the networking mode, the device data collection terminal 10 has a state of connecting to a network and a state of being connected to a network. If network information of the display terminal 20 is stored in the device data collection terminal 10, the device data collection terminal 10 enters the state of being connected to the network and is in wireless communication with the display terminal 20. If the device data collection terminal 10 needs to be in wireless communication with another display terminal 20, the first networking button may be operated to enable the device data collection terminal 10 to enter the state of connecting to the network. Then the device data collection terminal 10 is in wireless communication with the other display terminal 20. Before being connected successfully to the other display terminal 20, the device data collection terminal 10 may be connected to a previous display terminal 20 at any time. When being connected successfully to the other display terminal 20, the device data collection terminal 10 clears network information of the previous display terminal 20 and enters the state of being connected to the network. If the device data collection terminal 10 stores no network information of the display terminal 20, the device data collection terminal 10 enters the state of connecting to the network and then waits for the display terminal 20 to be connected to it. An interaction of the network information is performed between the display terminal 20 and the device data collection terminal 10. The device data collection terminal 10 is unable to enter the state of being connected to the network through operating the first networking button before being connected successfully to the display terminal 20. Since the device data collection terminal 10 includes the state of connecting to the network and the state of being connected to the network, the first networking module 12 also includes a state of connecting to a network and a state of being connected to a network. The first display device 13 is configured to inform, based on a change in the network connection state, the user of a current network connection state of the device data collection terminal 10.

For example, the first display device 13 is a monochrome indicator light 131. The monochrome indicator light 131 is a green light. When the device data collection terminal 10 is in the state of connecting to the network, the green light flashes rapidly. When the device data collection terminal 10 is networked successfully with the display terminal 20, the green light is always on. When the device data collection terminal 10 fails to find the display terminal 20, the green light flashes slowly.

It should be noted that the first networking module may be a Bluetooth module. The network information includes a network number. Each display terminal 20 has a unique network number, which can avoid a situation in which a data interaction between the display terminal 20 and the device data collection terminal 10 is affected due to one device data collection terminal 10 being connected to two display terminals 20 simultaneously.

Figure 3:
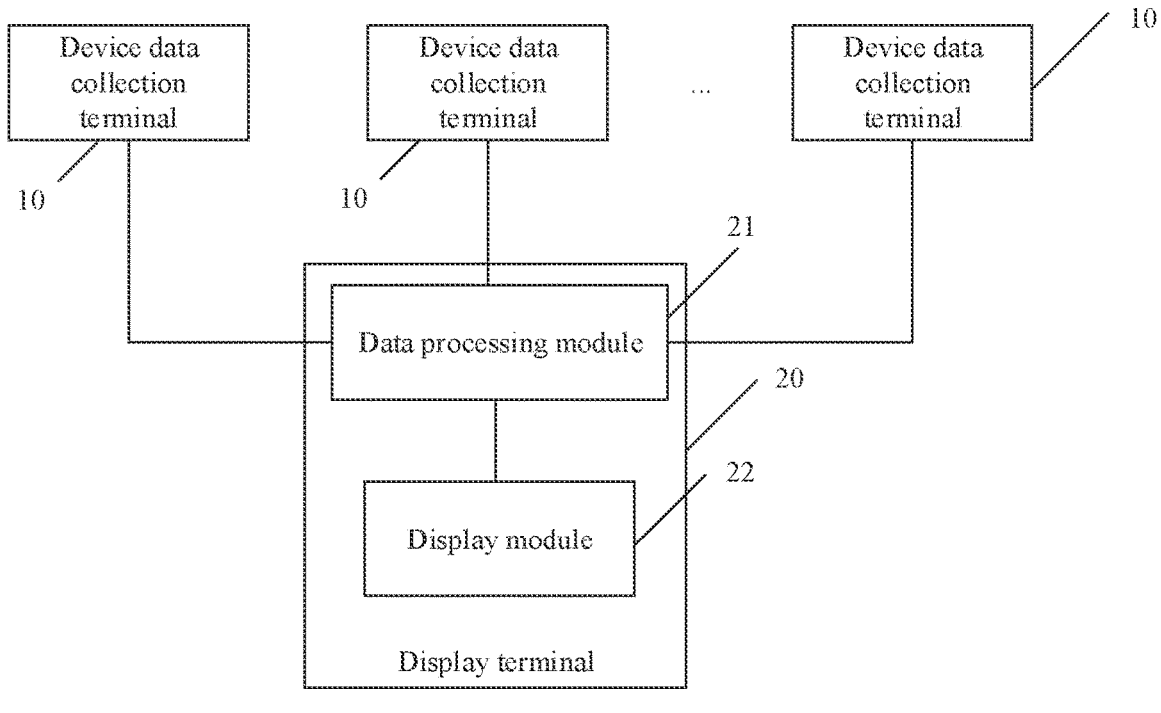
FIG. 3 is a schematic structural diagram of a display terminal according to an embodiment of the present disclosure.

In some embodiments, as illustrated in FIG. 3, the display terminal 20 includes a data processing module 21 and a display module 22. The data processing module 21 is in communication connection with the plurality of device data collection terminals 10, and is configured to process the device data based on a predetermined display format. The display module 22 is connected to the data processing module 21 and is configured to display the processed device data.

That is, the data processing module 21 is configured to process the device data based on the predetermined display format, and then the processed device data is displayed on the display module 22. In this way, the device data can be displayed based on the user's needs, which facilitates the user's understanding of an operation condition of the energy storage device 200.

For example, if the user needs to display the device data in a form of a histogram, the device data will be processed by the data processing module 21 based on a display format of the histogram. The histogram is displayed by the display module 22.

In another exemplary embodiment of the present disclosure, the display module 22 includes a display screen (not illustrated) and an indicator light (not illustrated). The display screen is configured to display the processed device data. The indicator light is configured to display an operation state of the display terminal 20. The indicator light is on when the display terminal 20 is in the operation state. The indicator light is off when the display terminal 20 is not in the operation state. The user can further select an operation mode of the display terminal 20 by operating the display screen. The operation mode of the display terminal 20 includes a search mode and a data collection mode. When a wireless network connection needs to be established between the display terminal 20 and the device data collection terminal 10, the user needs to operate the display screen to make the display terminal 20 enter the search mode. The display terminal 20 is configured to search for the device data collection terminal 10 in the state of connecting to the network and establish the wireless network connection and an information interaction with the device data collection terminal 10, in such a manner that the device data collection terminal 10 is networked successfully with the display terminal 20. Once being networked successfully, the display terminal 20 automatically enters the data collection mode.

In some embodiments, as illustrated in FIG. 3, the data processing module 21 is further adapted to be connected to an upper computer. The data processing module 21 is further configured to perform a format conversion on the device data, and to transmit the converted device data to the upper computer to enable the upper computer to display the converted device data.

In an exemplary embodiment of the present disclosure, the data processing module 21 may be in wireless communication with the upper computer through Bluetooth or Wireless Fidelity (WIFI). When the upper computer is a server, the data processing module 21 is in communication with the server through WIFI. The device data is obtained by an application of a cell phone from the server, in such a manner that the user can view the device data in the application of the cell phone. When the upper computer is a cell phone, the data processing module 21 is in communication with the cell phone through Bluetooth. Data may be obtained by an application of the cell phone directly from data processing module 21 through Bluetooth communication, and then the user can view the device data in the application of the cell phone. Since a data format of the cell phone differs from a data format of the device data, the format conversion needs to be performed on the device data by the processing module. In this way, the device data can be displayed by the cell phone.

It should be noted that, since the display terminal 20 is further in wireless communication with the cell phone, the user can transmit a predetermined instruction to the display terminal 20 through an application of the cell phone, to enable the display terminal 20 to enter the search mode. The display terminal 20 is configured to perform wireless networking with the device data collection terminal 10. The display terminal 20 is configured to automatically enter the data collection mode in response to successful networking.

In the above embodiments, the data processing module is further configured to transmit the converted device data to the upper computer. The user can query the device data of all energy storage devices on the upper computer, which makes an operation simple and convenient for the user.

In some embodiments, the display terminal 20 further includes an upgrade interface (not illustrated). The upgrade interface is adapted to be connected to the upper computer, to enable the upper computer to perform a firmware code upgrade on the display terminal 20.

In an exemplary embodiment of the present disclosure, when firmware codes of the display terminal 20 need to be upgraded or modified, the display terminal 20 may be directly connected to the upper computer through the upgrade interface. Then the firmware codes are directly upgraded by the upper computer.

It should be noted that the upper computer can further be configured to perform the firmware code upgrade on the display terminal 20 when the display terminal 20 is in communication connection to the upper computer.

In the above embodiment, the user can directly perform the firmware code upgrade on the display terminal through the upper computer. In this way, the upgrade can be performed without a maintenance professional, and a replacement of the display terminal is unnecessary, which further saves the user's time.

Figure 4:
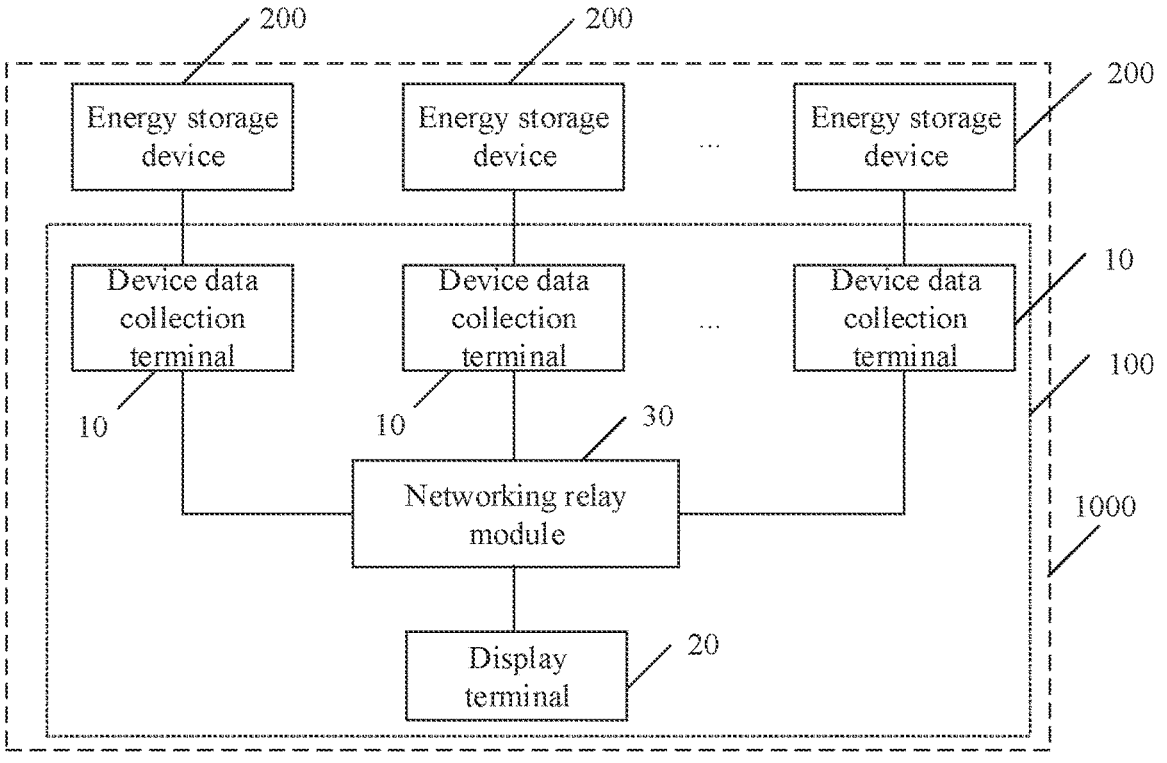
FIG. 4 is a schematic structural diagram of an energy storage system according to another embodiment of the present disclosure.

In some embodiments, as illustrated in FIG. 4, the information transmission apparatus 100 further includes a networking relay module 30. The networking relay module 30 is disposed between the plurality of device data collection terminals 10 and the display terminal 20. The networking relay module 30 is configured to forward the data query instruction to the device data collection terminal 10 and forward the device data to the display terminal 20.

In an exemplary embodiment of the present disclosure, when a distance between the device data collection terminal 10 and the display terminal 20 is short and there is no excessive obstruction blocking between the device data collection terminal 10 and the display terminal 20, the device data collection terminal 10 may directly be in communication connection with the display terminal 20. However, if the distance between the device data collection terminal 10 and the display terminal 20 is long, or there is excessive obstruction blocking between the device data collection terminal 10 and the display terminal 20, a signal strength between the device data collection terminal 10 and the display terminal 20 is unsatisfactory, which results in abnormal communication between the device data collection terminal 10 and the display terminal 20. Therefore, data transmission between the device data collection terminal 10 and the display terminal 20 needs to be relayed by the networking relay module 30 to reinforce the signal strength between the device data collection terminal 10 and the display terminal 20. In this way, normal communication can be realized between the device data collection terminal 10 and the display terminal 20.

It should be noted that the display terminal 20 may be connected to a plurality of networking relay modules 30 simultaneously. A quantity of the networking relay module 30 is not limited. If the distance between the display terminal 20 and the device data collection terminal 10 is long or a large number of obstructions exist, the plurality of networking relay modules 30 may be used for a data relay.

In the above embodiment, the data transmission between the device data collection terminal and the display terminal is relayed by the networking relay module, which can avoid an occurrence of a decrease in an accuracy of the device data caused by interference with the device data during the transmission. Therefore, stability of the information transmission apparatus can be ensured.

Figure 5:
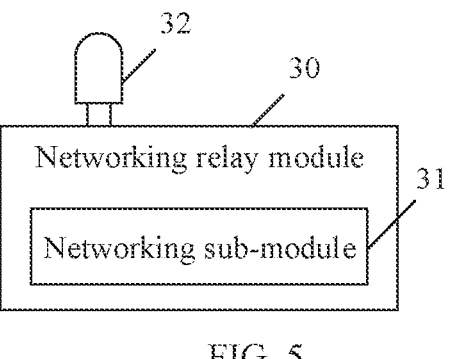
FIG. 5 is a schematic structural diagram of a networking relay module according to an embodiment of the present disclosure.

In some embodiments, as illustrated in FIG. 5, the network relay module 30 includes a networking sub-module 31, a second networking button (not illustrated), and a second display device 32. The networking sub-module 31 is configured to support a wireless networking mode. The second networking button is configured to enable, when triggered, the networking sub-module 31 to enter the wireless networking mode. The second display device 32 is configured to display a network connection state of the networking sub-module 31.

In an exemplary embodiment of the present disclosure, the networking sub-module 31 is configured to enter the wireless networking mode when the user presses the second networking button, to enable the networking relay module 30 to enter a networking mode. In the networking mode, the networking relay module 30 has a state of connecting to a network and a state of being connected to a network. If the network information of the display terminal 20 is stored in the networking relay module 30, the networking relay module 30 enters the state of being connected to the network and is in wireless communication with the display terminal 20. If the networking relay module 30 needs to be in wireless communication with another display terminal 20, the second networking button may be operated to enable the networking relay module 30 to enter the state of connecting to the network. Then the networking relay module 30 is in wireless communication with the other display terminal 20. Before being connected successfully to the other display terminal 20, the networking relay module 30 may be connected to a previous display terminal 20 at any time. When being connected successfully to the other display terminal 20, the networking relay module 30 clears network information of the previous display terminal 20 and enters the state of being connected to the network. If the networking relay module 30 stores no network information of the display terminal 20, the networking relay module 30 enters the state of connecting to the network and then waits for the display terminal 20 to be connected to it. An interaction of the network information is performed between the display terminal 20 and the networking relay module 30. The networking relay module 30 is unable to enter the state of being connected to the network through operating the second networking button before being connected successfully to the display terminal 20. The second display device 32 is configured to inform, based on a change in the network connection state of the networking sub-module 31, the user of a current network connection state of the networking relay module 30.

It should be noted that the networking sub-module 31 may be a Bluetooth module. A network connection method between the device data collection terminal 10 and the networking relay module 30 is the same as a network connection method between the device data collection terminal 10 and the display terminal 20, and thus details thereof will be omitted here.

In summary, according to the embodiments of the present disclosure, the information transmission apparatus for the energy storage system includes the plurality of device data collection terminals and the display terminal. Each of the plurality of device data collection terminals is adapted to be connected to one energy storage device. The device data collection terminal is configured to obtain, based on the stored device query instruction, the device data from the energy storage device corresponding to the device data collection terminal, and to transmit the device data to the display terminal in response to receiving the data query instruction transmitted by the display terminal. The display terminal is configured to display the device data. In this way, the device data of the plurality of energy storage devices can be displayed by the display terminal, which realizes the data integration for the plurality of energy storage devices. Therefore, the user has no need to switch between applications frequently, which saves the user's time.

Corresponding to the above-mentioned embodiments, the embodiments of the present disclosure further provide an energy storage system. As illustrated in FIG. 1, an energy storage system 1000 includes the information transmission apparatus 100 for the energy storage system according to any of the above-mentioned embodiments.

For the energy storage system according to the embodiments of the present disclosure, the above-mentioned information transmission apparatus is adopted. The device data collection terminal is connected to the energy storage device. Each device data collection terminal is configured to obtain the device data from the energy storage device corresponding to the device data collection terminal and transmit the device data to the display terminal. The display terminal is configured to display the device data. Therefore, the data integration for the plurality of energy storage devices is realized. In this way, the user has no need to switch between applications frequently, which saves the user's time.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. The appearances of the above phrases in various places throughout this specification are not necessarily referring to the same embodiment or example. Further, the particular features, structures, materials, or characteristics may be combined in any suitable manner in one or more embodiments or examples.

In addition, terms such as "first" and "second" in any of the embodiments of the present disclosure are only used for descriptive purposes, and cannot be understood as indicating or implying relative importance or implicitly indicating the number of indicated technical features in the embodiments. Therefore, the features associated with the terms such as "first" and "second" in any of the embodiments of the present disclosure may explicitly or implicitly include at least one of the features in the embodiment. In the description of the present disclosure, the word "plurality" means at least two, or two or more, such as two, three, four, etc., unless otherwise specifically defined.

In the present disclosure, unless otherwise clearly specified and limited, terms such as "install", "connect", "connect to", "fix", and the like should be understood in a broad sense. For example, it may be a fixed connection or detachable connection or connection as one piece; mechanical connection or electrical connection; direct connection or indirect connection through an intermediate; internal communication of two components or the interaction relationship between two components. For those skilled in the art, the specific meaning of the above-mentioned terms in the present disclosure can be understood according to specific implementations.

Although the embodiments of the present disclosure have been shown and described above, it should be understood that the above-mentioned embodiments are exemplary and should not be construed as limiting the present disclosure. Those skilled in the art can make changes, modifications, substitutions, and alternations to the above-mentioned embodiments within the scope of the present disclosure.

What is claimed is:

1. An information transmission apparatus for an energy storage system, comprising:
   a plurality of device data collection terminals; and
   a display terminal, wherein:
   each of the plurality of device data collection terminals is adapted to be connected to one energy storage device;
   the display terminal is configured to perform wireless communication with the plurality of device data collection terminals;
   the device data collection terminal is configured to store a device query instruction to obtain, based on the device query instruction, device data from an energy storage device corresponding to the device data collection terminal and store the device data, and to transmit the stored device data to the display terminal in response to receiving a data query instruction transmitted by the display terminal; and
   the display terminal is configured to display the device data;
   wherein the device query instruction is obtained through performing a format conversion on the data query instruction by the device data collection terminal in response to receiving the data query instruction for a first time.

2. The information transmission apparatus according to claim 1, wherein a same communication protocol is adopted by each of the plurality of device data collection terminals and an energy storage device corresponding to the device data collection terminal.

3. The information transmission apparatus according to claim 1, wherein the device data collection terminal comprises:
   a communication plug adapted to be connected to an energy storage device corresponding to the communication plug;
   a first networking module configured to support a wireless networking mode;
   a first networking button configured to enable, when triggered, the first networking module to enter the wireless networking mode; and
   a first display device configured to display a network connection state of the first networking module.

4. The information transmission apparatus according to claim 1, wherein the display terminal comprises:
   a data processing module in communication connection with the plurality of device data collection terminals, the data processing module being configured to process the device data based on a predetermined display format; and
   a display module connected to the data processing module, the display module being configured to display the processed device data.

5. The information transmission apparatus according to claim 4, wherein the data processing module is further adapted to be connected to an upper computer; and
   the data processing module is further configured to perform a format conversion on the device data, and to transmit the converted device data to the upper computer to enable the upper computer to display the converted device data.

6. The information transmission apparatus according to claim 4, wherein the display terminal further comprises:
   an upgrade interface adapted to be connected to an upper computer, to enable the upper computer to perform a firmware code upgrade on the display terminal.

7. The information transmission apparatus according to claim 1, further comprising:
   a networking relay module disposed between the plurality of device data collection terminals and the display terminal, the networking relay module being configured to forward the data query instruction to the device data collection terminal and forward the device data to the display terminal.

8. The information transmission apparatus according to claim 7, wherein the networking relay module comprises:
   a networking sub-module configured to support a wireless networking mode;
   a second networking button configured to enable, when triggered, the networking sub- module to enter the wireless networking mode; and
   a second display device configured to display a network connection state of the networking sub-module.

9. An energy storage system, comprising the information transmission apparatus for the energy storage system according to claim 1.

10. The energy storage system according to claim 9, wherein a same communication protocol is adopted by each of the plurality of device data collection terminals and an energy storage device corresponding to the device data collection terminal.

11. The energy storage system according to claim 9, wherein the device data collection terminal comprises:

a communication plug adapted to be connected to an energy storage device corresponding to the communication plug;

a first networking module configured to support a wireless networking mode;

a first networking button configured to enable, when triggered, the first networking module to enter the wireless networking mode; and a first display device configured to display a network connection state of the first networking module.

12. The energy storage system according to claim 9, wherein the display terminal comprises:

a data processing module in communication connection with the plurality of device data collection terminals, the data processing module being configured to process the device data based on a predetermined display format; and a display module connected to the data processing module, the display module being configured to display the processed device data.

13. The energy storage system according to claim 12, wherein the data processing module is further adapted to be connected to an upper computer; and the data processing module is further configured to perform a format conversion on the device data, and to transmit the converted device data to the upper computer to enable the upper computer to display the converted device data.

14. The energy storage system according to claim 12, wherein the display terminal further comprises:

an upgrade interface adapted to be connected to an upper computer, to enable the upper computer to perform a firmware code upgrade on the display terminal.

15. The energy storage system according to claim 9, wherein the information transmission apparatus further comprises:

a networking relay module disposed between the plurality of device data collection terminals and the display terminal, the networking relay module being configured to forward the data query instruction to the device data collection terminal and forward the device data to the display terminal.

16. The energy storage system according to claim 15, wherein the networking relay module comprises:

a networking sub-module configured to support a wireless networking mode;

a second networking button configured to enable, when triggered, the networking sub- module to enter the wireless networking mode; and a second display device configured to display a network connection state of the networking sub-module.

* * * * *